United States Patent [19]

Newman, Sr.

[11] 4,127,224
[45] Nov. 28, 1978

[54] ADJUSTABLE STOCK BUSHING

[75] Inventor: William E. Newman, Sr., Baltimore, Md.

[73] Assignee: Paul Donald Newman, Baltimore, Md.

[21] Appl. No.: 792,310

[22] Filed: Apr. 29, 1977

[51] Int. Cl.² .......................................... B65H 23/32
[52] U.S. Cl. .................................... 226/3; 226/199; 279/107
[58] Field of Search ...................... 226/1, 3, 165, 166, 226/167, 186, 187, 198, 199; 279/36, 106, 107

[56] References Cited

U.S. PATENT DOCUMENTS

| | | | |
|---|---|---|---|
| 1,308,176 | 7/1919 | Field | 279/107 |
| 1,634,422 | 7/1927 | Holmes | 279/107 |
| 3,060,773 | 10/1962 | Stroms | 226/199 X |

Primary Examiner—Richard A. Schacher
Attorney, Agent, or Firm—John F. McClellan, Sr.

[57] ABSTRACT

An axially compact adjustable stock-bushing assembly for substitution for non-adjustable or solid bushings to hold stock in automatic screw machines and the like; stock is held by three radially pivotable fingers carried in equi-spaced protrusion from one end of an annular nut having at the other end provision for mounting to an automatic screw machine; the fingers are spring-biased outwardly and are positioned by means of inward urging of a cam ring assembly coaxially threaded to one end of the annular nut and carrying fitted over the respective fingers three circumferentially deployed cams which are radially pivotable to either of two stock-size range settings by respective cam-adjustment tabs; screwing of the cam ring assembly further toward the annular nut moves the cams along the finger inclines for tightening the fingers on stock; set screws through the cam ring parallel with the axis bear on a knurled face of the nut, when tightened, to maintain any desired stock-size setting of the assembly.

26 Claims, 7 Drawing Figures

ADJUSTABLE STOCK BUSHING

This invention relates generally to work holders and specifically to stock bushings for automatic screw machines and the like.

A principal object of the invention is to provide an adjustable stock bushing which is sufficiently compact axially to replace standard non-adjustable stock bushings in present automatic screw machine use.

In the prior art numerous stock holding devices have been disclosed, including disclosures in the following U.S. Pat. Nos.:

3,892,419 to Richard C. Jackson et al filed July 1, 1975; 2,534,878 to H. V. Packer filed Dec. 19, 1950; 1,634,422 to A. T. Holmes filed July 5, 1927; 1,477,440 to F. A. Frier, Jr. filed Dec. 11, 1923;

1,463,412 to D. B. Weller filed July 3, 1923.

Jackson discloses a cam ring to move the jaws of a chuck.

Packer discloses cam operated die head chasers.

Holmes and Grier disclose cam actuated coupling device.

Weller discloses a cam operated gear chuck.

Spiral cam actuated chucks with reciprocating jaws appear in scores of examples in the Patent Office, both in U.S. and foreign patents.

However in spite of the relations noted, none of these nor any other prior art is known to provide the full combination of structure, or the function, or the "action" in use, of the present invention as set forth in the objects of this invention.

A further object, set out for exposition and not limitation, is to provide a bushing as described which combines a ring assembly carrying circumferentially mounted and inclined radially pivotable dual-range cams for coaction with an annular nut to which threaded for relative axial movement producing, simultaneously upon screwing together, both a radial tightening of stock-holding fingers pivotally carried in extension from the nut and within the ring assembly and a frictional tightening of the assembly sufficient to hold it in adjustment while set-screws relatively urging the ring assembly and nut are tightened.

Other objects are to provide a bushing as described which quickly and securely adjusts in infinite increments within two overlapping ranges.

Other objects are to provide a bushing as described which is self-protecting, durable, tough and compact; which is easy to operate and convenient and reliable in use; which is jam resistant, safe and economical; which is simple to assemble and to take apart when desired, and which can be embodied in various sizes without manufacturing difficulty.

In brief summary given for cursive description only and not as limitation, the invention includes first and second screw-related coaxial annular members, the first pivotally carrying circumferential cams for constraining axially extending fingers radially pivotally carried by the second upon screwing together.

The above and other objects and advantages of this invention will become more readily apparent on examination of the following description, including the drawings, in which like reference numerals indicate like parts:

BRIEF OVERVIEW OF STRUCTURE AND OPERATION

Figure 1:
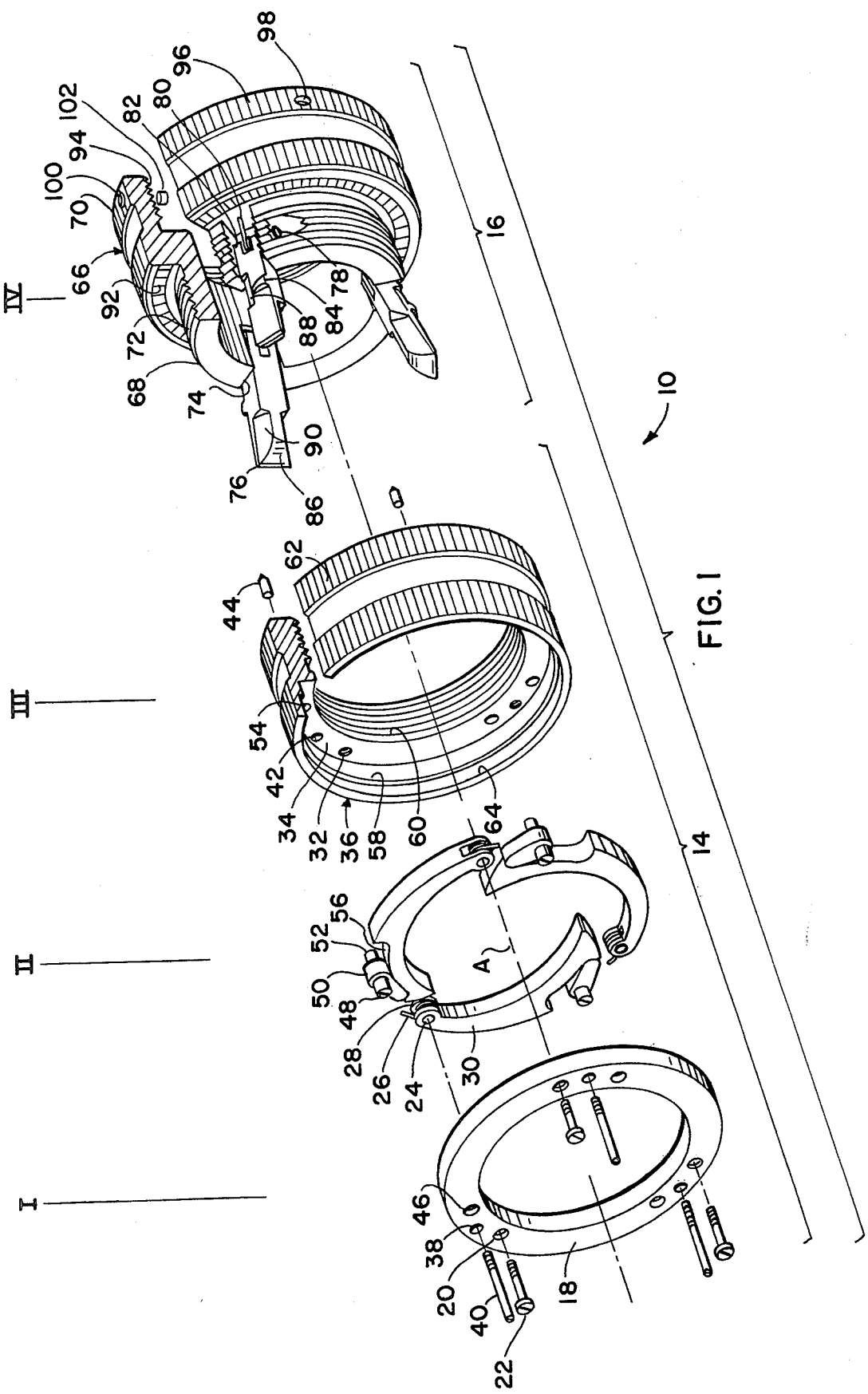
FIG. 1 is an exploded view of the invention, shown partially in section for exposition.

FIG. 1 shows that the parts making up the assembly of this invention may be thought of as comprising four groups, I, II, III and IV.

Group I operatively retains the Group II arcuate-cam and tab pivotal elements within the counterbore of the Group III annular member forming a first subassembly. This subassembly receives within the bore the three protrusive pivotally mounted fingers of Group IV, the second subassembly, when the two subassemblies are threaded together.

Figure 3:
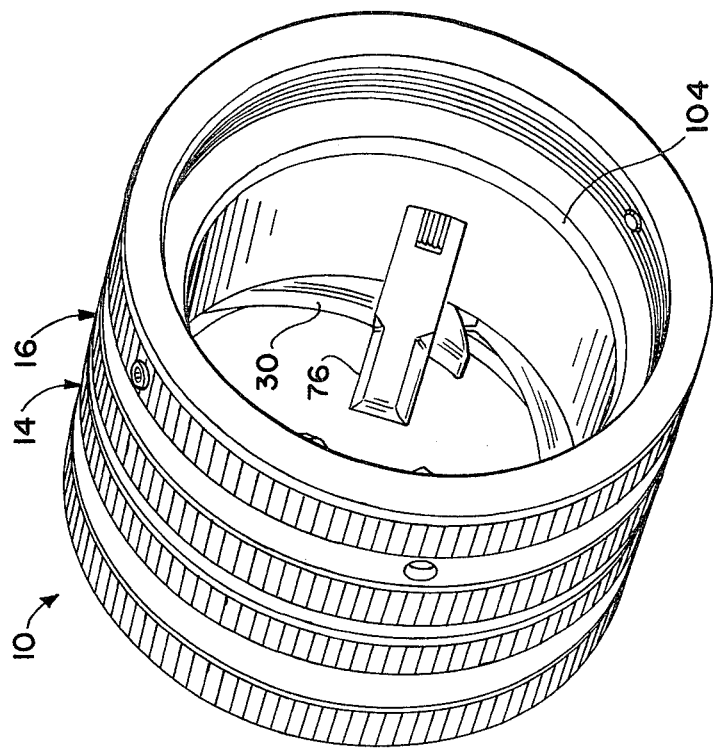
FIG. 3 is a rear isometric view set in the same operational range.
Figure 2:
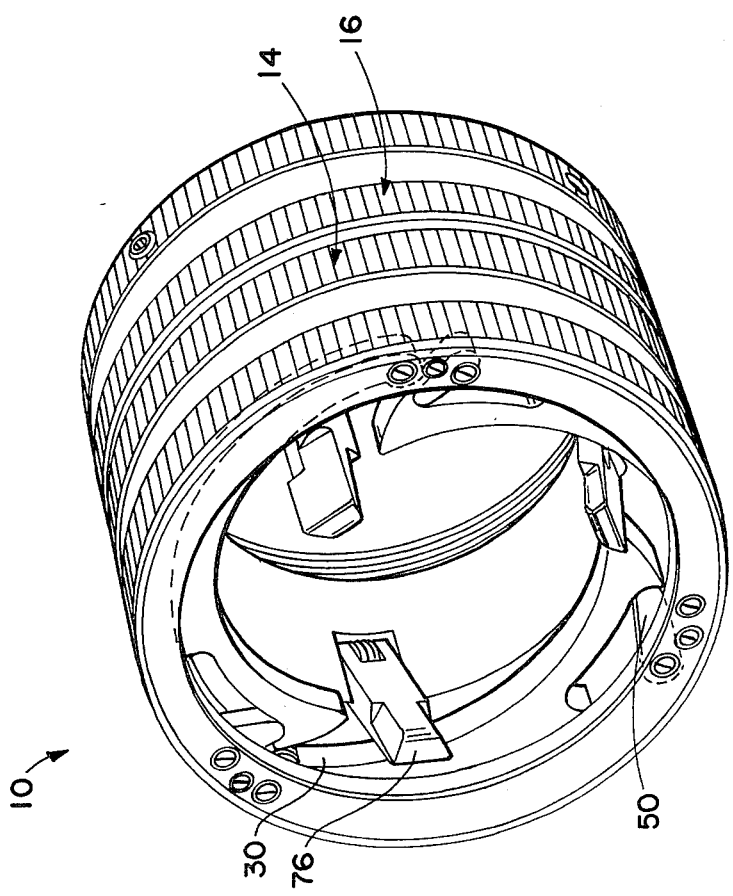
FIG. 2 is a front isometric view of the invention set in an operational range.

FIGS. 2 and 3 show the two subassemblies threaded together.

FIGS. 4a, 4b, and 5a and 5b illustrate operation.

Stock is received through the front of the first subassembly.

Operation requires merely rotating the first subassembly with respect to the second subassembly to adjust the fingers in-and-out to fit and guide stock passed through the bore. The tabs of Group II set the finger-adjusting arcuate cams in either of two ranges, the range of FIGS. 4a and b, or the range of FIGS. 5a and b.

DETAILS OF STRUCTURE, FIG. 1

FIG. 1 divides the invention 10 into four component groups for purposes of exposition. Groups I, II and III assemble into a first or adjustment ring subassembly 14 and Group IV comprises a coaxially mounted second or nut subassembly 16.

To the left at Group I, annular retainer plate has three sets of holes in three uniform arrays of holes grouped at 120° intervals.

Holes 20 of the first set pass respective cap screws 22 which extend through corresponding holes 24 and biasing springs 26 in the forked ends 28 of three circumferentially related arcuate cams 30 at Group II and thread into corresponding tapped holes 32 in the counterbore face 34 of ring 36 in Group III, pivotally mounting the cams about axes parallel with the axis A of the invention.

Holes 38 of the second set pass respective set screws 40 which extend through the gaps between the cams in Group II and thread into tapped holes 42 in the counterbore face of the ring and bear on respective hard plugs 44, which then bias toward rearward extension from the ring to lock the relative rotational position of the Group IV subassembly when desired, as will be described.

Holes 46 of the third set capture the operatively slotted front pin 48 which is integral with each rotatable tab 50 in Group II; the coaxial and integral smaller diameter rear pins 52 extend from the respective tabs into corresponding mounting holes 54 in the counterbore face of the ring.

The tabs, when respectively rotated to the inwardly extending position shown in recesses 56 in the inner faces of the cams adjacent the first or free ends, set the cams at the inward radial rotation position, establishing the small-stock range. When, as viewed from the left in the Figure, each tab is rotated counterclockwise, the cams reset outwardly establishing the large-stock range.

The springs described, at one end engage the cams and at the other bear on the circumference 58 of the ring counterbore and bias the cams outwardly at all times, stabilizing the freely pivoting cams and tabs.

Concentric threads 60 in the rear portion of the bore of the ring provide for threading it adjustably onto the Group IV subassembly and exterior knurling 62 facilitates manual gripping for adjustment.

On assembly, the annular retainer plate fits flush into annular recess 64 in the ring.

GROUP IV

The group IV subassembly consists of only twelve components: the body or "nut", three fingers, each with a pivot pin and spring mounting it to the nut, and two set-screws in the nut.

The nut 66 comprises an annular body with concentric smaller-diameter forward portion 68 and larger-diameter rearward portion 70. The forward portion has external thread 72 for adjustable screw-connection with the previously described adjustment ring subassembly. Three axial slots 74 cut through the forward portion serve as mounting recesses for three respective forwardly projecting fingers or jaws 76, pivotally secured to pivot radially in axial planes by respective transverse pins 78. A spring 80 coiled around each pin with one free end engaging the nut and the other free end engaging the finger biases each finger outwardly, operating in similar manner to the cam springs. As in the case of the cams, the forked ends 82 of the fingers with the springs inside provide the broadest base possible in the width, for stability and long wear.

The fingers project forwardly from the slots in position for the finger midportions to be encompassed and radially adjusted by the cams on assembly of the two subassemblies. Each finger midportion has for faithful following and even wear an integral cam-follower protrusion 84 on the outer surface, in the form of a crown, with convex radius both in fore-and-aft and in circumferential direction at an incline conforming to the generally helical angle of the cam disposition, but with a sharper curvature than the cam inner surface curvature.

This double-radius crown configuration adapts each finger to follow smoothly along the generally cylindrical but inclined cam inner surface contour during the characteristic compound motion of adjustment, relatively travelling simultaneously in circumferential and axial direction, in either of the two range settings. In addition each forward end of a finger has a radius 86 from the inner surface outwardly for uniform stock engagement regardless of setting. For compactness, a clearance 88 is provided as an inward transverse contouring of each finger at the lesser-swing end of each crown incline. Further, each forward end of a finger has a mortise-like slope 90 on each lateral face so that each finger has a portion which narrows in cross-section inwardly to provide space between fingers permitting close-in adjustment for small stock.

It will be appreciated that misdirected stock passing into the front of the assembly will either cause the fingers to yield resiliently against the spring force, or will be deflected by the finger curvature to proper position along the axis.

An axial knurled locking face 92 is provided at the flange where the forward portion of the nut enlarges into the rearward portion; against this the hard plugs are forced as previously described, by set screws 40 (Group I), when relative rotation of the ring assembly and nut assembly is to be constrained to maintain or lock-in an adjustment of the fingers. It is evident that alternatively the set screws could be directed forward through the nut and bear on the rear of the adjustment ring, but that the present arrangement provides convenient proximity to the tabs for actuating purposes.

Internal mounting-threads 94 in the counterbored rearward portion of the nut provide for securing the invention on an automatic screw machine or the like; external flanges around the threads are provided with knurling 96 and spanner wrench holes 98 for tightening the nut, and radial set screws 100 driving "Teflon" or other soft plugs 102 provide for securing the nut at any rotational setting, as for matching orientation of hexagonal-stock collets.

ISOMETRIC VIEWS OF THE ASSEMBLY, FIGS. 2 and 3

FIG. 2 shows relations of the parts of the invention assembled, in front isometric view. Clockwise relative rotation of the knurled adjustment-ring subassembly 14 which carries the cams 30, with respect to the nut subassembly 16 which carries the fingers 76, cams the fingers inwardly, and counterclockwise relative rotation cams them outwardly.

Tabs 50 are shown holding the cam free-ends in the inward position, providing the small-stock range. Because this increases the slope of the cams, adjustment action is faster in this range. Loads are transmitted through each cam pivot screw and the tab pin extensions, forward and aft.

For the larger stock size range, the tabs are pivoted counterclockwise, causing the cam free-ends to swing outward under the spring bias. Heavier loads encountered with larger stock sizes are carried through contact between the outer radius of the cams (contoured and tapering larger toward the freeend for the purpose) and the inner circumference of the adjustment ring counterbore which the outer radius fits.

FIG. 3, in isometric view of the rear indicates that stock passed through the invention in either direction cannot hang on the pivoted ends of the fingers, flush mounted in the recesses. In the reverse direction annular chamfer 104 deflects misdirected stock toward the center as does the inward incline of the fingers, which also shield the cams. It will be evident that not only can both circular cross-section stock and stock of hexagonal cross section be handled in the embodiment illustrated, but that special cross sections can be accommodated in particular embodiments made according to the principles of the invention without need for further invention.

ILLUSTRATIVE EXAMPLES OF SETTINGS IN THE TWO RANGES, FIGS. 4a, 4b, 5a and 5b FIG. 4a illustrates the position of the fingers 76 at the widest opening in the larger-stock range (with tabs 50 retracted from cams 30). This setting approximately corresponds to the diameter of the bore of the invention. Limiting means for receiving stock is in this aspect the bore-defining structure, the nut subassembly 16.

Figure 4A:
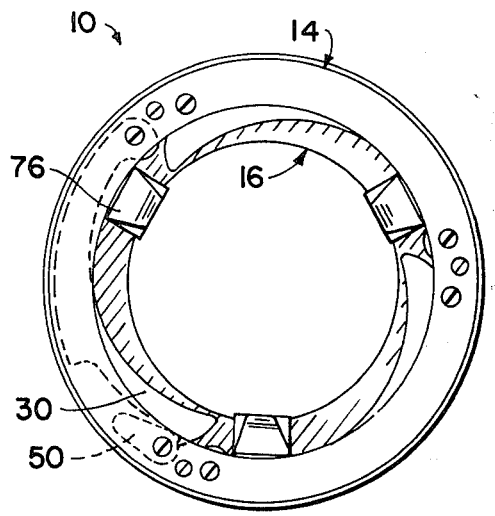
FIGS. 4a and 4b are front axial views respectively of two settings in a first range of settings.
Figure 4B:
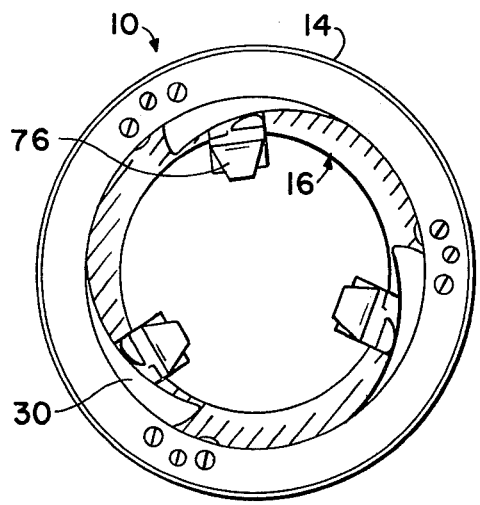

FIG. 4b shows the fingers at an intermediate adjustment in the larger-stock range achieved by rotation of the nut 16 relative to the means for adjusting, the adjustment ring subassembly 14.

Figure 5A:
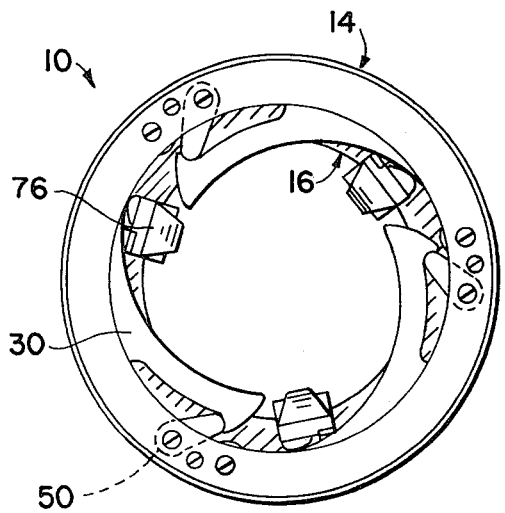
FIGS. 5a and 5b are front axial views respectively of two settings in a second range of settings.

FIG. 5a shows the fingers at approximately the widest setting in the smaller-stock range (with tabs 50 holding the free-ends of the cams 30 inwardly).

Figure 5B:
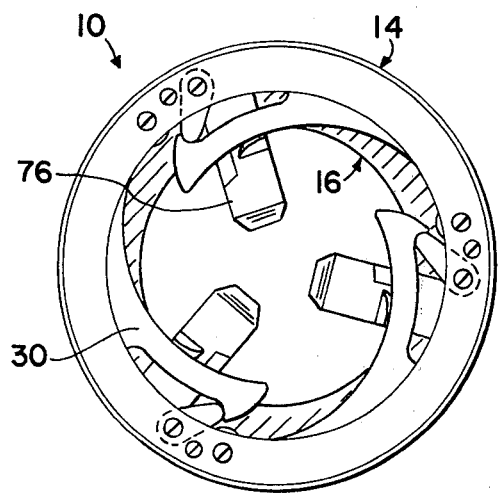

FIG. 5b shows the fingers at an intermediate screw-adjustment position in the smaller-stock range. It can be seen that in this range the fingers can be brought nearly together. Continued screwing simply clicks the cams past the fingers, recycling, until finally the two subassemblies safely abut at the facing flanges after several turns.

The cams as a group preferably have and maintain the transverse contour of the arcuate surfaces parallel with the axis for the following purpose. It will be evident that cam wear can be equalized and cam life extended by choosing a fresh path along the cam for the cam follower by varying by one full thread the screw-threaded relation of the first and second subassemblies, the adjustment ring and the nut, and that the fresh relation does not affect rotary adjustment position. Further, cam contour can be cylindrical for ease in manufacture on the inner face as well as the outer face, although the two faces are not concentric for reasons described above.

It will also be evident that except for the necessary thread engagement length of the nut for mounting on an automatic screw machine, the remainder of the length of the invention is compactly substantially equal to the finger length, and additionally shields the fingers throughout most of the length, while leaving them and the other working parts readily accessible for inspection.

Compactness, reliability, adaptability and simplicity are provided further by the pivotally convergent finger structure constrained by the dual-range cams which pivot substantially radially in a plane perpendicular to the axis, permitting all parts except the soft plugs to be made of hardened steel.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be secured by U.S. Letters Patent is:

1. An adjustable stock bushing comprising: means for receiving stock from a direction axially of said means for receiving, including means for adjustably guiding stock received; a plurality of circumferentially related means for adjusting, said means for adjusting having coaxial relatively rotatable mounting to said means for receiving, positioned for adjusting said means for adjustably guiding in a radial direction upon said relative rotation, the means for adjustably guiding having pivotal inclination inwardly to said axis, and each of said means for adjusting having means for pivoting a portion thereof inwardly for changing range of said adjusting.

2. The method of adjusting in convergence a group of fingers for guiding stock entering a bushing from an axial direction, comprising the steps:
   a. pivotally supporting the fingers at an inclination to said axial direction;
   b. contactingly surrounding the group of fingers with a group of arcuate-surface cams in circumferential disposition about said axis;
   c. Pivoting each said cam for movement in a plane perpendicular to said axis;
   d. adjusting the pivotal position of each said cam, and
   e. screwing said group of cams along said axis relative to said group of fingers, thereby adjusting in convergence the group of fingers.

3. The method of adjusting as recited in claim 2, and additionally the step of adjusting for cam wear by maintaining said cam arcuate surfaces parallel with said axis, and recycling said adjustment by further screwing said group of cams along said axis.

4. An adjustable stock bushing comprising: a first subassembly including: an adjustment ring having a plurality of cams in circumferential relation, each cam with a portion having inwardly arcuate shape; a threaded portion on the adjustment ring; a second subassembly including a nut, a threaded portion on the nut for engagement with the threaded portion on the adjustment ring by relative rotation of the nut and adjustment ring; a plurality of fingers and, means mounting the fingers pivotally to and in forward projection from the nut in position for radial adjustment of the fingers by respective cams on said relative rotation.

5. An adjustable stock bushing as recited in claim 4, each cam having a first and a second end and means pivotally mounting the second end.

6. An adjustable stock bushing as recited in claim 5, and means for biasing each cam outwardly.

7. An adjustable stock bushing as recited in claim 6, said second end having fork shape and the means for biasing being contained in said fork shape.

8. An adjustable stock bushing as recited in claim 5, and means for biasing said fingers outwardly.

9. An adjustable stock bushing as recited in claim 8, each finger having a first end and a second end, said first end having an outwardly radiused portion for engaging stock.

10. An adjustable stock bushing as recited in claim 9, said second end having fork-shape, and the finger outwardly biasing means contained in said fork shape.

11. An adjustable stock bushing as recited in claim 5, each finger having an outer surface with a cam follower portion thereon.

12. An adjustable stock bushing as recited in claim 11, the cam follower portion comprising an outward protrusion comprising a crown with convex radius both in fore-and-aft and in circumferential direction, the cam disposable at a generally helical incline and the cam follower having an incline conforming generally thereto.

13. An adjustable stock bushing as recited in claim 12, the cam structure defining an inward transverse clearance at an end of each crown incline.

14. An adjustable stock bushing as recited in claim 11, each finger having a portion narrowing inwardly in cross-section.

15. An adjustable stock bushing as recited in claim 5, said nut having means for mounting to an automatic screw machine or the like for receiving stock in an axial direction into the nut, and said fingers inclinable inwardly and toward said direction, for guiding stock.

16. An adjustable stock bushing as recited in claim 15, said nut having a chamfer therein for inwardly deflecting stock.

17. An adjustable stock bushing as recited in claim 5, and means for locking together in rotation said first and second subassemblies.

18. An adjustable stock bushing as recited in claim 17, said means for locking including at least one of said first and second subassemblies having a set screw passing therethrough in a location for an end of the setscrew to bear on the other of said first and second subassemblies.

19. An adjustable stock bushing as recited in claim 5, and means for setting the cam pivotal position to one of plural positions establishing respective ranges of said radial adjustment of the fingers by the respective cams on said relative rotation.

20. An adjustable stock bushing as recited in claim 19, the means for setting cam pivotal position including a rotatable tab movably mounted on said first assembly, cam structure defining a recess for receiving the tab at one position of rotation.

21. An adjustable stock bushing as recited in claim 20, the tab including unitary pivot structure protrusive therefrom and means for engaging the tab for rotating the tab.

22. An adjustable stock bushing as recited in claim 19, the adjustment ring having structure defining an axial counterbore therein, said plurality of cams within said counterbore in position for outer surfaces thereof to bear outwardly on a portion of said counterbore structure at one cam pivotal position setting.

23. An adjustable stock bushing as recited in claim 22, each cam having a taper portion increasing toward said first end.

24. An adjustable stock bushing as recited in claim 22, a retainer plate, and means for securing the plurality of cams within the counterbore with said retainer plate.

25. An adjustable stock bushing as recited in claim 19, the threaded portion on the adjustment ring comprising interior threads rearwardly therein, and the threaded portion on the nut comprising exterior threads on a forward portion thereof.

26. An adjustable stock bushing as recited in claim 25, the nut structure defining a plurality of slots in said forward portion, and the respective finger pivotal mounting being inside said respective slots.

* * * * *